(12) United States Patent
Lee (10) Patent No.: US 6,219,350 B1
(45) Date of Patent: Apr. 17, 2001

(54) ATM CELL CONVERTING APPARATUS WHICH INCLUDES TONE AND DTMF GENERATING FUNCTION AND METHOD USING THE SAME

(75) Inventor: Tae Jae Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/270,045

(22) Filed: Mar. 16, 1999

(30) Foreign Application Priority Data

Mar. 17, 1998 (KR) .................................................. 98-8976

(51) Int. Cl.[7] .............................. H04L 12/28; H04J 3/16; H04J 3/12
(52) U.S. Cl. ........................... 370/395; 370/467; 370/525
(58) Field of Search .................................. 370/465, 466, 370/467, 522, 525, 526, 395, 401, 412, 352, 354

(56) References Cited

U.S. PATENT DOCUMENTS

| | | | |
|---|---|---|---|
| 4,998,276 | * 3/1991 | Hasegawa | 379/361 |
| 5,327,492 | * 7/1994 | Parola | 379/361 |
| 5,457,684 | * 10/1995 | Bharucha et al. | 370/352 |
| 5,483,527 | * 1/1996 | Doshi et al. | 370/360 |
| 5,666,357 | * 9/1997 | Jangi | 370/345 |
| 5,698,805 | * 12/1997 | Thompson et al. | 84/615 |
| 5,748,637 | * 5/1998 | Joffe et al. | 370/516 |
| 5,764,645 | * 6/1998 | Bernet et al. | 370/466 |
| 5,930,477 | * 7/1999 | Uchida | 395/200 |
| 6,023,474 | * 2/2000 | Gardner et al. | 370/467 |

* cited by examiner

Primary Examiner—Chau Nguyen
Assistant Examiner—Chiho Andrew Lee
(74) Attorney, Agent, or Firm—Fleshner & Kim, LLP (57) ABSTRACT

An ATM cell converting apparatus and method provided with a tone and DTMF generating function generates tone and DTMF which are necessary to a switching system and outputs to a TDM network channel data of an ATM cell type which are read from a cell buffer of a memory unit or tone and DTMF which are read from a tone and DTMF register in accordance with a function type of a data converting unit.

37 Claims, 9 Drawing Sheets

| | | APV | CELL BUFFER #0 |
|---|---|---|---|
| TRUNK #0 | CHANNEL 0 | | CELL BUFFER #1 |
| | CHANNEL 1 | | |
| | ⋮ | | ⋮ |
| | CHANNEL N-1 | | |
| TRUNK #1 | CHANNEL 0 | | |
| | CHANNEL 1 | | |
| | ⋮ | | ⋮ |
| | CHANNEL N-1 | | |
| | | | |
| | | | ⋮ |
| TRUNK #K-1 | CHANNEL 0 | | |
| | CHANNEL 1 | | |
| | ⋮ | | ⋮ |
| | CHANNEL N-1 | | CELL BUFFER #N-1 |

FIG. 4
BACKGROUND ART

| | WSEG | RPTR |
|---|---|---|
| CELL BUFFER #0 | RSEG | PAL |
| CELL BUFFER #1 | | |
| ⋮ | ⋮ | ⋮ |
| CELL BUFFER #N-1 | | |

ATM CELL CONVERTING APPARATUS WHICH INCLUDES TONE AND DTMF GENERATING FUNCTION AND METHOD USING THE SAME

BACKGROUND OF THE INVENTION

1. Field of the Invention

The present invention relates to a switch system, and more particularly to an ATM (Asynchronous Transfer Mode) cell converting apparatus provided with a tone and DTMF (Dual Tone Multifrequency) generating function and a method using the same.

2. Description of the Conventional Art

Generally, an ATM switch system which asynchronously transmits various information has data transmission speed which is considerably faster than a synchronous transmitting system. Accordingly, in recent years many efforts have been made to apply the ATM switch system to a broadband ISDN (Integrated Services Digital Network) and accordingly various interfaces have been standardized. However, since a great cost is required to replace the existing networks with ATM networks, another substitutive method has been suggested, which mutually uses the existing TDM (Time Division Multiplex) networks and the ATM networks.

Figure 1:
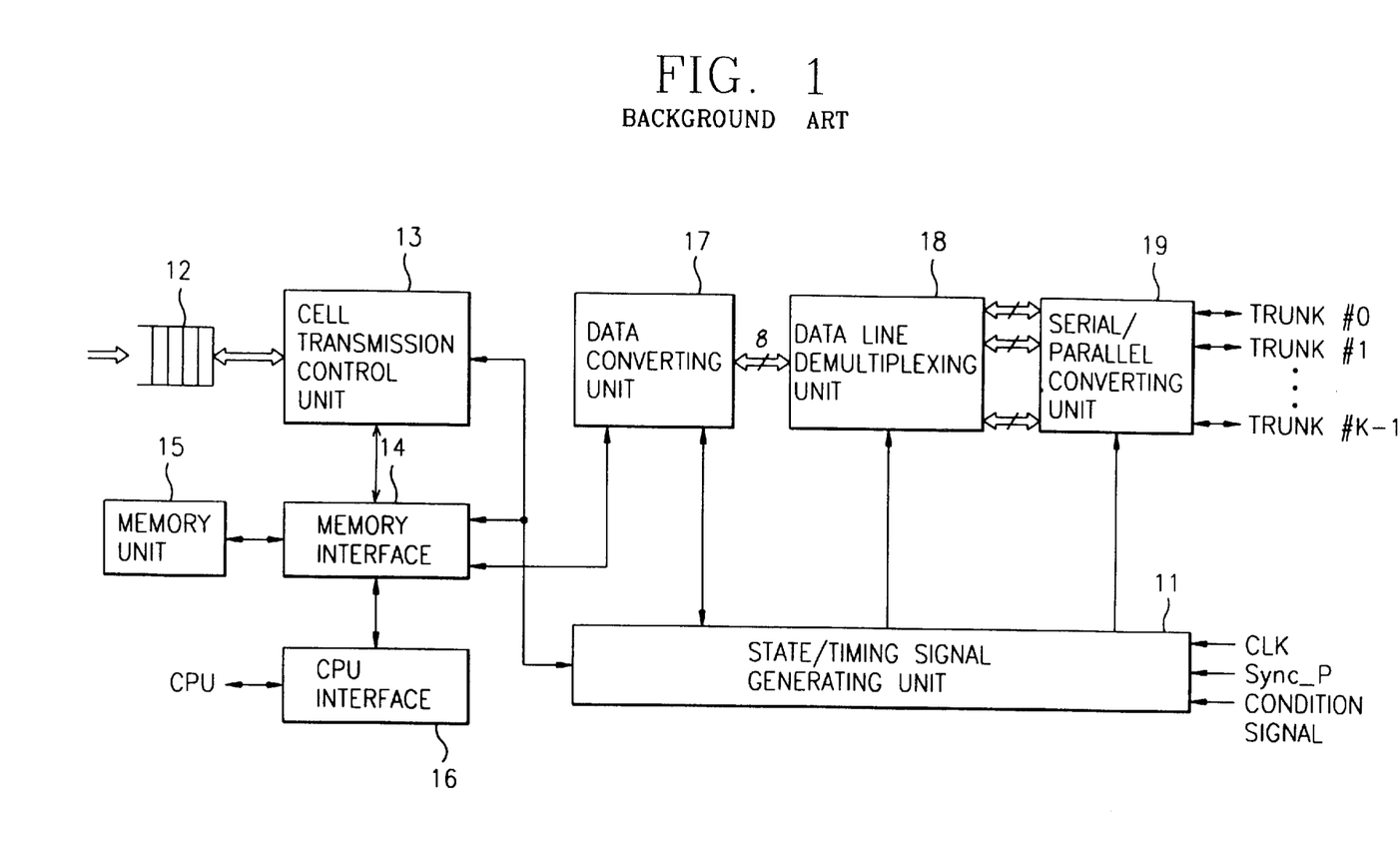
FIG. 1 is a block diagram of a conventional ATM cell converting apparatus.

FIG. 1 is a diagram illustrating a conventional ATM cell converting device for operating both of the TDM network and the ATM network. As shown therein, the conventional ATM cell converting device consists of a state/timing signal generating unit 11, a FIFO 12, a cell transmission control unit 13, a memory interface 14, a memory unit 15, a CPU interface 16, a data converting unit 17, a line data demultiplexing unit 18 and a serial/parallel converting unit 19.

Specifically, the state/timing signal generating unit 11 generates frame synchronous signals, clock signals, state signals, trunk numbers and time slot numbers (channel numbers) in accordance with a clock signal CLK, a synchronous pulse signal Syn_P and a condition signal which are outputted from a CPU (not shown). Here, the generated frame synchronous signal is inputted to the cell transmission control unit 13, the data converting unit 17 and the serial/parallel converting unit 19, the state signal, the trunk number and the time slot number (the channel number) are inputted to the data converting unit 17.

The FIFO 12 stores an ATM cell inputted through an ATM transmission line which is connected to an ATM switching network, and the cell transmission control unit 13 stores in the memory unit 15 the ATM cell which has been stored in the FIFO 12 through the memory interface 14, based upon a VCI (Virtual Channel Identifier) of a cell header region, in accordance with the frame synchronous signal.

The memory interface 14 matches the cell transmission control unit 13, the CPU interface 16 and the data converting unit 17 to the memory unit 15, arbitrates signals inputted (outputted) to(from) the memory unit 15 in accordance with the clock signal outputted from the state/timing signal generating unit 11 and notifies the cell transmission control unit 13, the CPU interface 16 and the data converting unit 17 of an arbitrating result.

Figure 3:
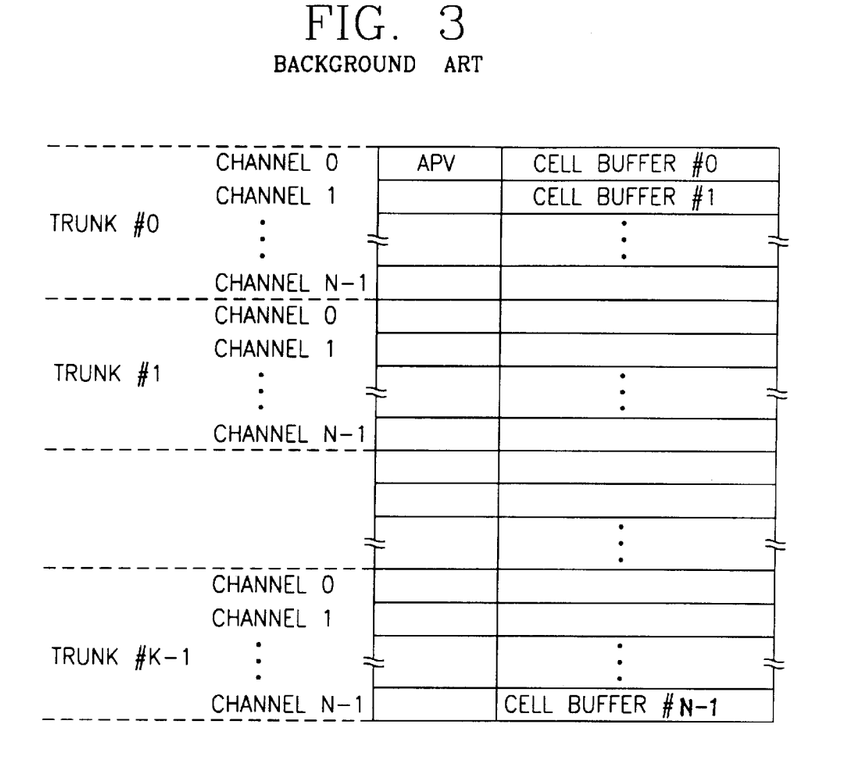
FIG. 3 is a detailed block diagram of a link table provided in a memory unit of FIG. 1.
Figure 4:
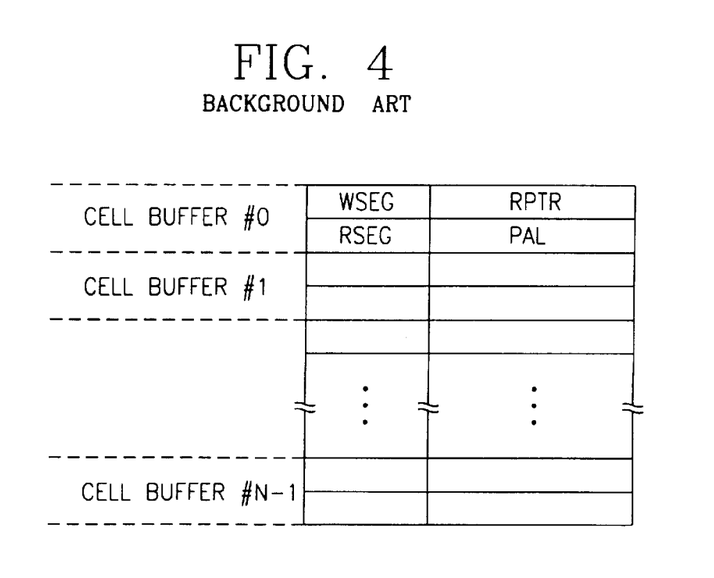
FIG. 4 is a detailed block diagram of a cell buffer control table provided in the memory unit of FIG. 1.
Figure 5:
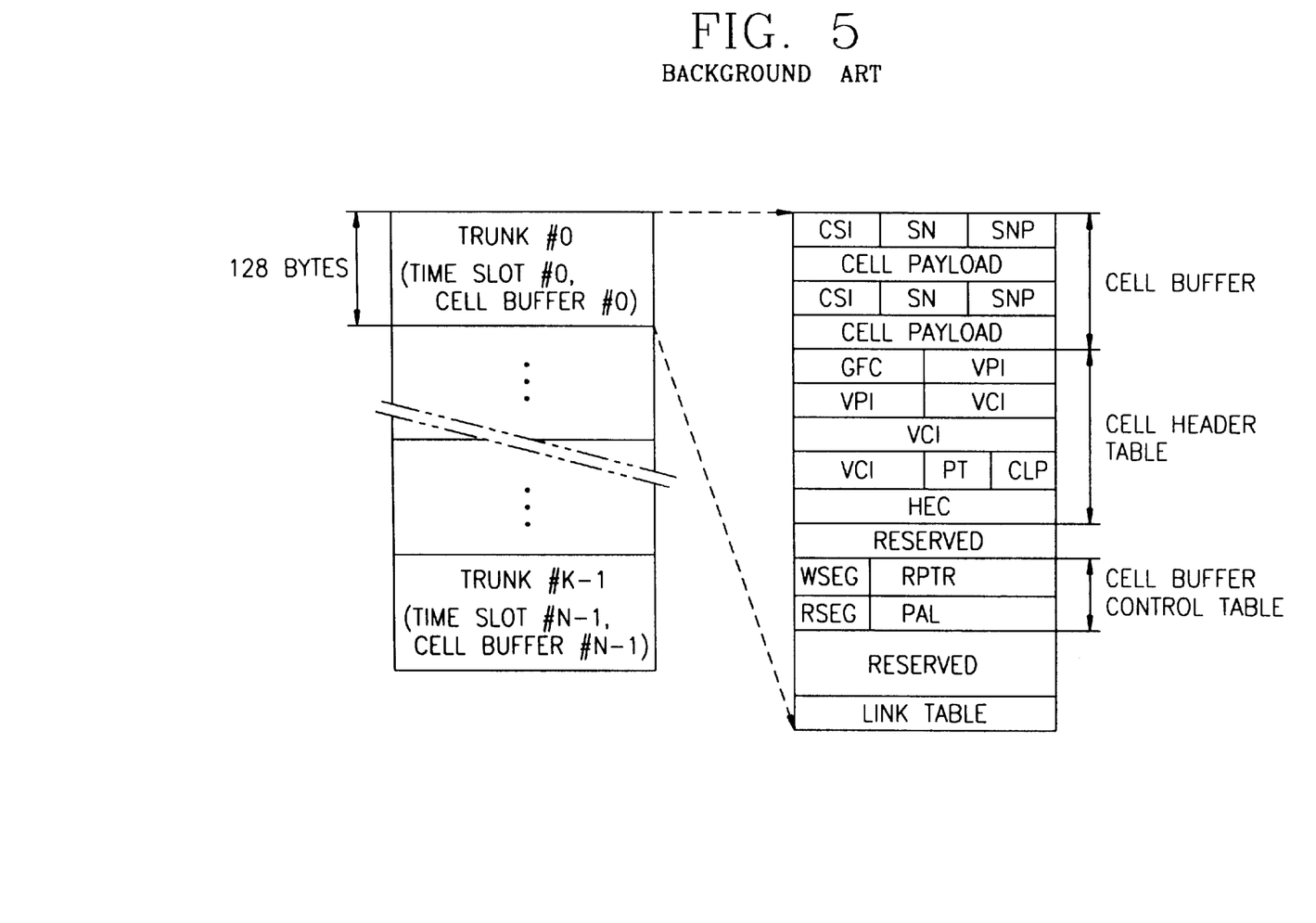
FIG. 5 is a diagram illustrating a cell buffer map file of the memory unit of FIG. 1.

Further, the memory unit 15 includes a link table, a cell buffer control table, a cell header table and a cell buffer. In FIGS. 3 and 4, the link table and the cell buffer control table, respectively, are illustrated in more detail. Further, FIG. 5 illustrates a map file of the memory unit 15. As shown therein, the elements thereof are respectively allocated by corresponding to trunks and time slots.

The link table connects time slot data in each trunk with a cell buffer. Here, an address of each item of the link table has a one-to-one correspondence with a trunk number and a time slot number and a content of each item indicates a cell buffer number. Further, the cell buffer control table stores information necessary to each cell buffer, while the cell header control table stores header information of an ATM cell. In addition, in the cell buffer 1 time slot data on a trunk line are sequentially stored byte by byte.

The CPU interface 16 interfaces signals which are inputted and outputted between the CPU (not shown) and the memory interface 14, and the data converting unit 17 reads and outputs 1-byte channel data of the ATM cell type to the demultiplexing unit 18, in accordance with the trunk number and time slot number (the channel number) which are outputted from the state/timing signal generating unit 11. Then, the line data demultiplexing unit 18 inverse-multiplexes the 1-byte channel data outputted from the data converting unit 17 to parallel data in accordance with the trunk number, and the serial/parallel converting unit 19 converts the 1-byte parallel data which have been inverse-multiplexed to serial data which are to be outputted to trunks(#0~#k−1) of the TDM system.

In such a conventional ATM cell converting apparatus, the ATM cell which is inputted through the ATM cell transmission line is stored in the FIFO 12, and the cell transmission control unit 13 reads the ATM cell from the FIFO 12 and stores the cell in the memory unit 15 in accordance with the frame synchronous signal. That is, on the basis of VCI information which is stored in the header region of the ATM cell, the ATM cell which has been read is stored through the memory interface 14 in a corresponding cell buffer of the memory unit 15.

Further, the data converting unit 17, being synchronized with the frame synchronous signal, reads the channel data from a cell buffer of the memory unit 15 in accordance with the trunk number and the time slot number which are outputted from the state/timing signal generating unit 11 every time slot period and outputs the data to the line data demultiplexing unit 18. The line data demultiplexing unit 18 applies time division inverse multiplexing, in accordance with the time slot, to the 1-byte channel data outputted from the data converting unit 17 which are to be 1-byte parallel data. Accordingly, the serial/parallel converting unit 19 converts the 1-byte parallel data outputted from the line data demultiplexing unit 18 to serial data and outputs the converted data to the trunks(#0~#k−1) of the TDM system.

Next, to describe the operation of a FSM (Finite State Machine) which outputs the ATM cell to the line data demultiplexing unit 18 byte by byte, first the FSM is installed in the data converting unit 17 and transits its state in accordance with a state signal outputted from the state/timing signal generating unit 11. Here, a whole cycle of the FSM is accomplished in the 1 time slot, and the state signal has a period in which the 1 time slot is divided into K, wherein K is the total number of trunks.

First, when a system reset signal Sys_rst is inputted, an initialization is performed to a hardware and a software of the ATM cell converting apparatus. Then, when an initialization end signal End_init is inputted, the FSM is transited to a CPU access state. In such a state, the CPU (not shown) sets through the CPU interface and the memory interface the link table, the cell buffer control table and the cell header table provided in the memory unit 15. Here, access to the memory unit 15 by another hardware blocks is prohibited. The memory unit 15 is more detailedly illustrated in FIG. 5.

Further, when the synchronous pulse signal Syn_P is inputted, the FSM is transited to a link table access state, and the state/timing signal generating unit 11 generates and outputs to the FSM the state signal, the frame synchronous signal, the trunk number and time slot number (the channel number).

Accordingly, in such a link table access state, the FSM reads a cell buffer number allocated in a channel of each trunk and a call set bit (APV) with respect to the corresponding channel from the link table, as shown in FIG. 3, in accordance with the trunk line number and the time slot number (the channel number) which are outputted from the state/timing signal generating unit 11. For example, the FSM reads a cell buffer number #1 which corresponds to a channel 1 of a trunk #0 and a call set bit (APV) of the channel 1. If no call is set in the corresponding channel (APV=0), the FSM accesses the link table after increasing the trunk line number by 1. If the trunk line number accords with the last trunk number #k−1 which is connected with the ATM cell converting apparatus, the FSM transits to the CPU access state or a cell receiving state after checking whether or not the FIFO 12 is empty.

Meanwhile, if a call is set in the corresponding channel (APV=1), the FSM transits to the control table access state which accesses the corresponding item of the cell buffer control table by using the cell buffer number, for example #1, which has been read, as an access address. In such a control table access state, as shown in FIG. 4, the FSM reads from the cell buffer control table a read segment bit RSEG, a read pointer RPTR of a cell buffer and cell payload length information PAL and then transits in order to a cell buffer access state, a control table correction state and a line data demultiplexing unit access state.

More specifically, in the cell buffer access state, the FSM reads channel data which are to be outputted from the cell buffer which is indicated by the read segment bit RSEG to the line data demultiplexing unit 18 by using the read pointer RPTR, and also increase the read pointer RPTR 1 by 1 to thereby compare the resultant read pointer RPTR with the cell payload length information PAL. When the present read pointer RPTR is identical to the cell payload length information PAL, that is, when the read pointer RPTR indicates the last data of the cell payload, the FSM transits to the control table modifying state, thereby inverting the read segment bit RSEG, initializing the read pointer RPTR of the cell buffer and then modifying a cell buffer control table value.

Figure 2A:
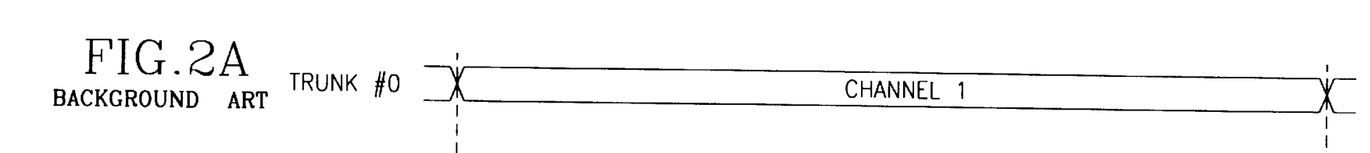
FIG. 2 is a diagram illustrating 1 time slot data outputted from a data converting unit.
Figure 2B:
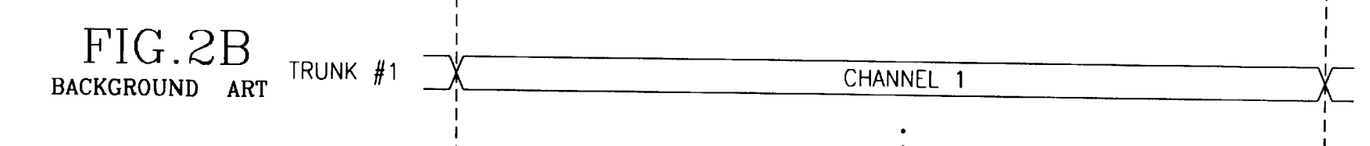
Figures 2C, 2D:
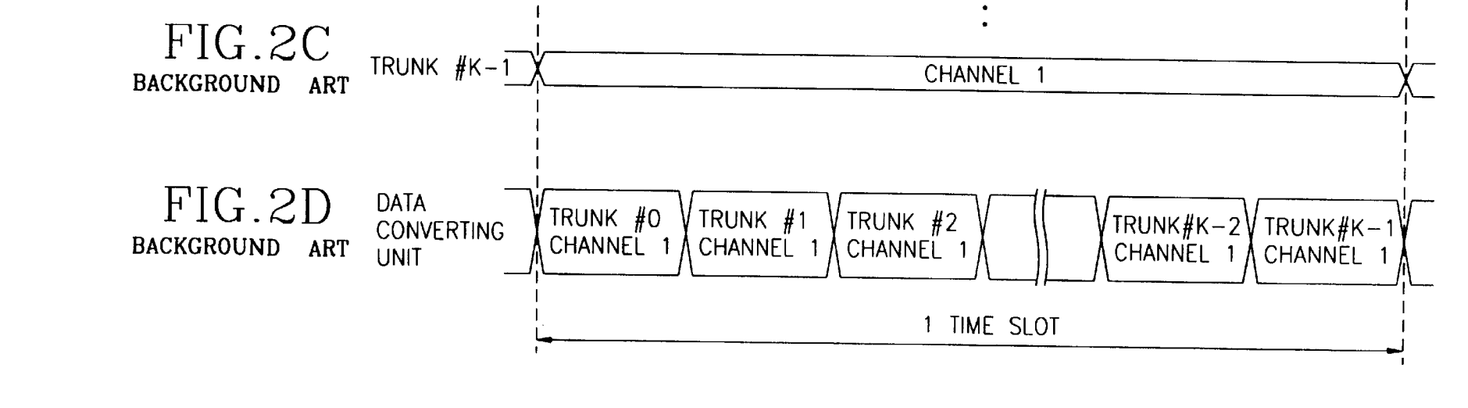

Further, when the FSM transits to the line data demultiplexing unit access state, the FSM outputs channel data which have been read in the cell buffer access state, as shown in FIG. 2D, to the line data demultiplexing unit 18. Here, if a trunk line number of presently processed line data does not accord with the last trunk line number #k−1 connected with the ATM cell converting apparatus, the FSM increases the trunk line number by 1 and then transits to the link table access state. On the other hand, if the trunk line number of the channel data accords with the last trunk line number #k−1, the FSM checks the empty state of the FIFO 12 and transits to the cell receiving state or the CPU access state.

In the cell receiving state, the cell transmission control unit 13 receives one cell from the FIFO 12 and then stores the the cell in the cell buffer of the cell memory unit 15 using the VCI information of the cell header and the cell transmission control unit 13 transmits a cell end signal Cell_end to the FSM, when the cell receiving operation is completed, the cell end signal Cell_end indicating the completion of receiving the ATM cell. Therefore, the FSM transits from the cell receiving state to the CPU access state, thus performing the operation identical to the above process.

Accordingly, the line data demultiplexing unit 18 applies the time division inverse multiplexing to the 1-byte channel data outputted from the data converting unit 17 which are to be 1-byte parallel data, and the serial/parallel converting unit 19 converts the 1-byte parallel data outputted from the demultiplexing unit 18 to serial data and outputs the data to the trunks(#0~#k−1).

As described above, the conventional ATM cell converting apparatus converts the ATM cell, which is inputted through the transmission line of the ATM system, to channel data by trunks and outputs the converted data through the plurality of trunks connected to the network of the TDM system, thereby mutually operating the networks of the ATM system and the TDM system. Further, in this specification, although the transmitting operation from the ATM network to the TDM network is only described for convenience of explanation, the conventional ATM cell converting apparatus also transmits the ATM cell from the TDM network to the ATM network.

However, the conventional ATM cell converting apparatus itself, which mutually operates the networks of the ATM network and the TDM network, does not have a tone and DTMF generating function which is required in the switch system. Thus, when applying the conventional ATM cell converting apparatus to the switch system, a tone and DTMF generator should be separately provided and further a separate switching device should be used to switch tone and DTMF which are generated by the tone and DTMF generator to channels of each trunk.

In addition, since each country uses a different tone and DTMF Spec. with regard to the switch system, it is difficult to make on-line tone and DTMF modification.

SUMMARY OF THE INVENTION

Accordingly, the present invention is directed to an ATM cell converting apparatus and method which obviates the problems and disadvantages due to the conventional art.

An object of the present invention is to provide an ATM cell converting apparatus and method provided with a tone and DTMF generating function.

Another object of the present invention is to provide an apparatus for ATM cell converting which is capable of easily modifying tone and DTMF to be suitable to a software.

To achieve these and other advantages and in accordance with the purpose of the present invention, as embodied and broadly described, there is provided an ATM cell converting apparatus which includes: an ATM cell transmission line connected with an ATM network; a plurality of trunk lines connected with a TDM network; and an ATM cell converting unit for outputting through the trunk lines ATM cell type data received through the AMT cell transmission line or tone and DTMF data which are generated of itself.

Also, to achieve the above objects of the present invention, there is provided an ATM cell converting method, including: setting various tables of a memory unit; accessing a link table of the memory unit in accordance with a trunk line number and a time slot number outputted from a state/timing signal generating unit; reading each of items of a cell buffer control table on the basis of a cell buffer number which is read in the link table; discriminating a function type which is read in the cell buffer control table; and reading channel data or tone and DTMF data from the memory unit in accordance with the discriminated function type and outputting the data to a line data demultiplexing unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 6:
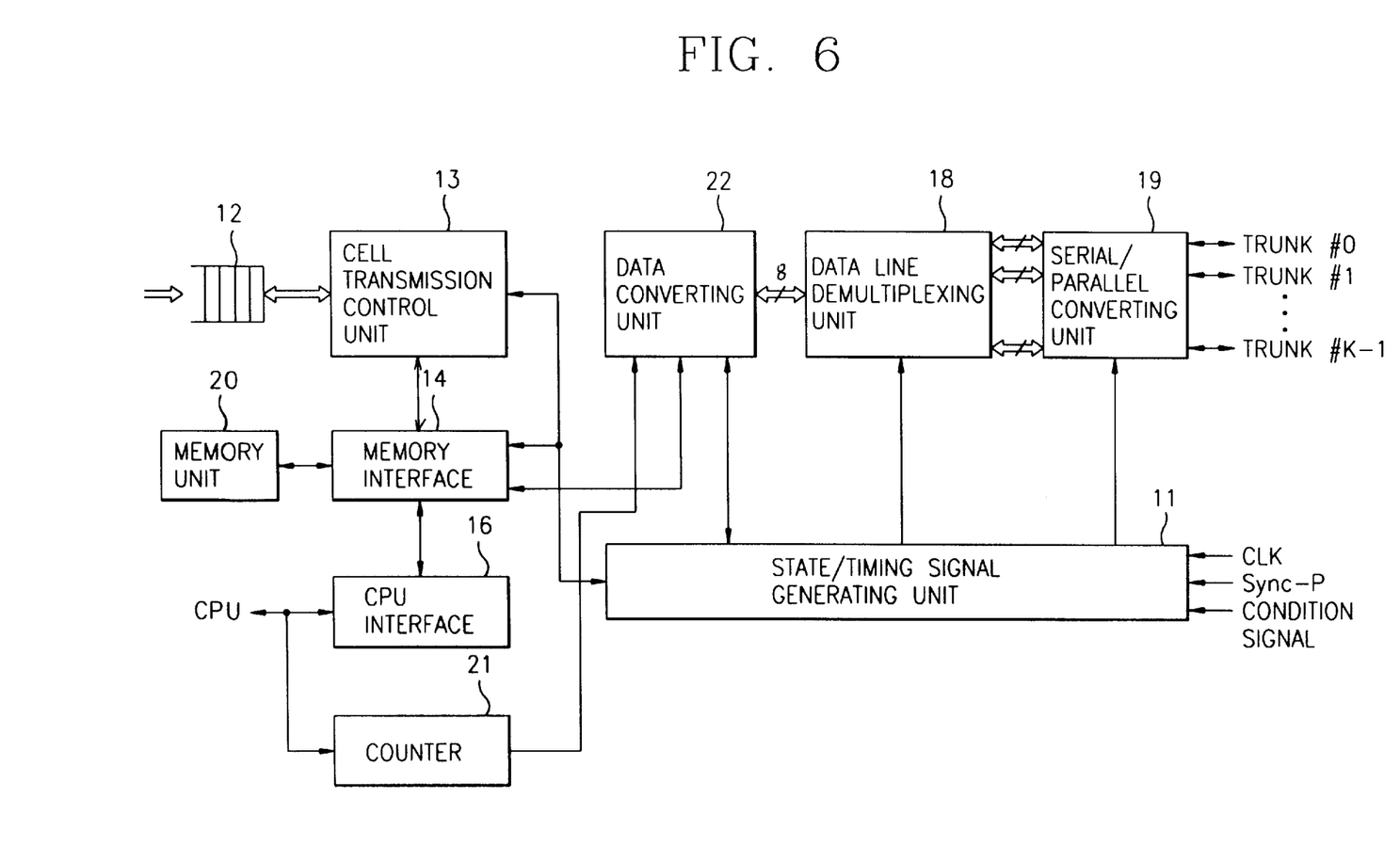
FIG. 6 is a block diagram of an ATM cell converting apparatus according to the present invention.
Figure 7A:
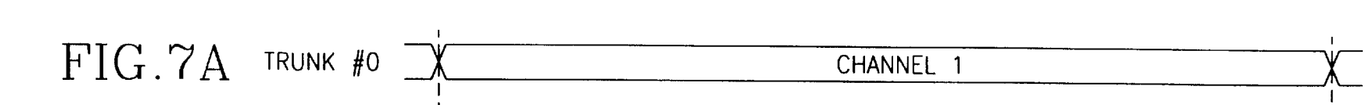
FIG. 7 is a timing diagram illustrating an operation of a data converting unit in 1 time slot.
Figure 7B:
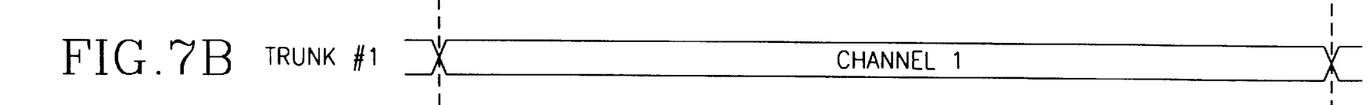
Figure 7C:
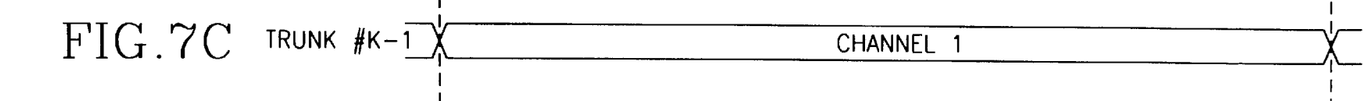
Figure 7D:
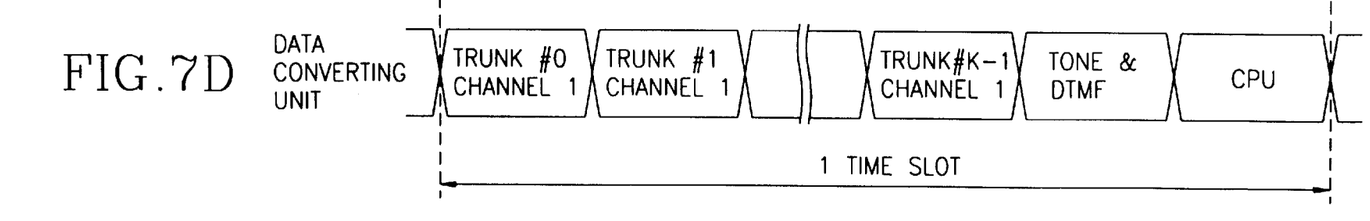

As shown in FIG. 6, the ATM cell converting apparatus according to the present invention has a structure similar to the conventional ATM cell converting apparatus. However, the main differences between the present invention and the conventional art are an internal construction of a memory unit 20 and an operation of a FSM provided in the data converting unit 22. Further, according to the present invention, there are additionally provided a register in which tone and DTMF are separately stored and a counter 21 for making a cadence unit time. Items of a function type FT are additionally included in the cell buffer control table, the item of the function type indicating a function which the FSM of the data converting unit 22 performs. Here, those which are identical to the elements in the conventional art have the same reference numbers.

The memory unit 20 includes a tone and DTMF source buffer, a cadence control table and a tone and DTMF register, beside the conventional cell buffer and various tables such as a link table, a cell buffer control table and a cell header table which are required to operate the cell buffer.

Figure 8:
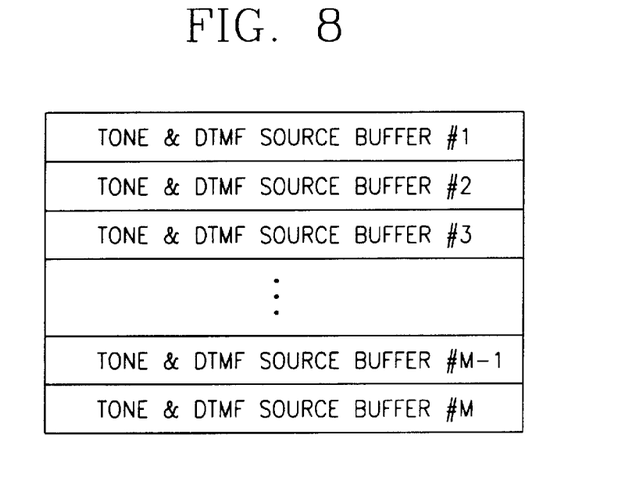
FIG. 8 is a diagram illustrating a tone and DTMF source buffer region of a memory unit.

More specifically, as shown in FIG. 8, the tone and DTMF source buffer stores tone and DTMF source data which are PCM codes of a signal in which at least two frequencies combine. The cadence control table of FIG. 9 stores tone and DTMF source numbers SB_id which are required to generate tone and DTMF and cadence (time information) designated to each of tone and DTMF sources. Here, it is to be noted that the number of the cadence control tables is identical to the number of time slots of 1 frame. The tone and DTMF register stores tone and DTMF data which are generated in accordance with the cadence and the tone and DTMF source, the number of the tone and DTMF registers being identical to the number of time slots of 1 frame.

The counter 21 which performs a function of counting the unit time of the cadence in accordance with the control of a CPU (not shown) compares a count value every frame by increasing the value by "1" with a specific value set by the CPU. If the compared values are not identical, the counter 21 sets a cadence unit time flag as "0" and if identical, the counter 21 set the flag as "1" and becomes initialized. Here, the specific value set by the CPU actually means a unit time of the cadence time.

According to the present invention, in addition to a normal service (NS), a tone and DTMF service (T&D) function is performed by the FSM of the data converting unit 22. That is, the FSM, which reads a function type FT and a read pointer RPTR from the cell buffer control table, performs the operation same as the conventional art if the function type FT is NS and the FSM outputs to a line data demultiplexing unit 18 tone or DTMF data which have been read from the tone and DTMF register in accordance with a number (T&D_id) of the tone and DTMF register of the cell buffer control table if the function type FT is set as T&D.

The operation of the ATM cell converting apparatus according to the present invention will be described in detail with reference to the accompanying drawings. Here, in the present invention no description of the operation will be made with regard to the state/timing signal generating unit 11, the FIFO 12, the cell transmission control unit 13, the memory interface 14, the CPU interface 16, the line data demultiplexing unit 18 and the serial/parallel converting unit 19, since these elements have the same operation as the conventional art.

As in the conventional art, the FSM of the data converting unit 22 has a whole cycle in 1 time slot. In addition, when an initialization of the ATM cell converting apparatus according to the present invention is completed after system reset, the FSM transits to a control table access state through a CPU access state and a link table access state. In other words, when a system reset signal Sys_rst is inputted, the FSM transits to an initial state, and if inputting an initialization end signal End_init which informs that the initialization of a hardware and a software of the ATM cell converting apparatus, the FSM transits to the CPU access state.

Figure 9:
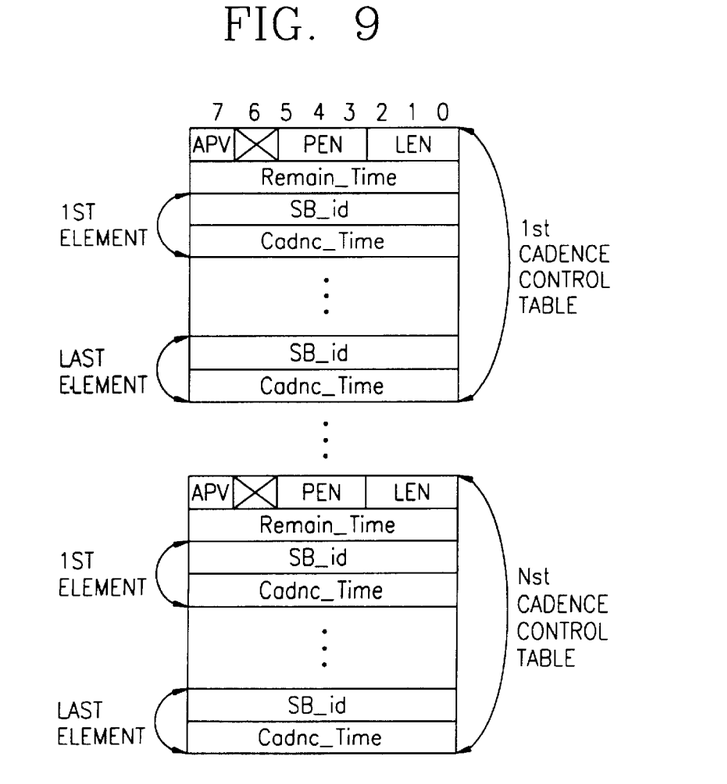
FIG. 9 is a diagram illustrating a cadence control table provided in the memory unit.
Figure 10:
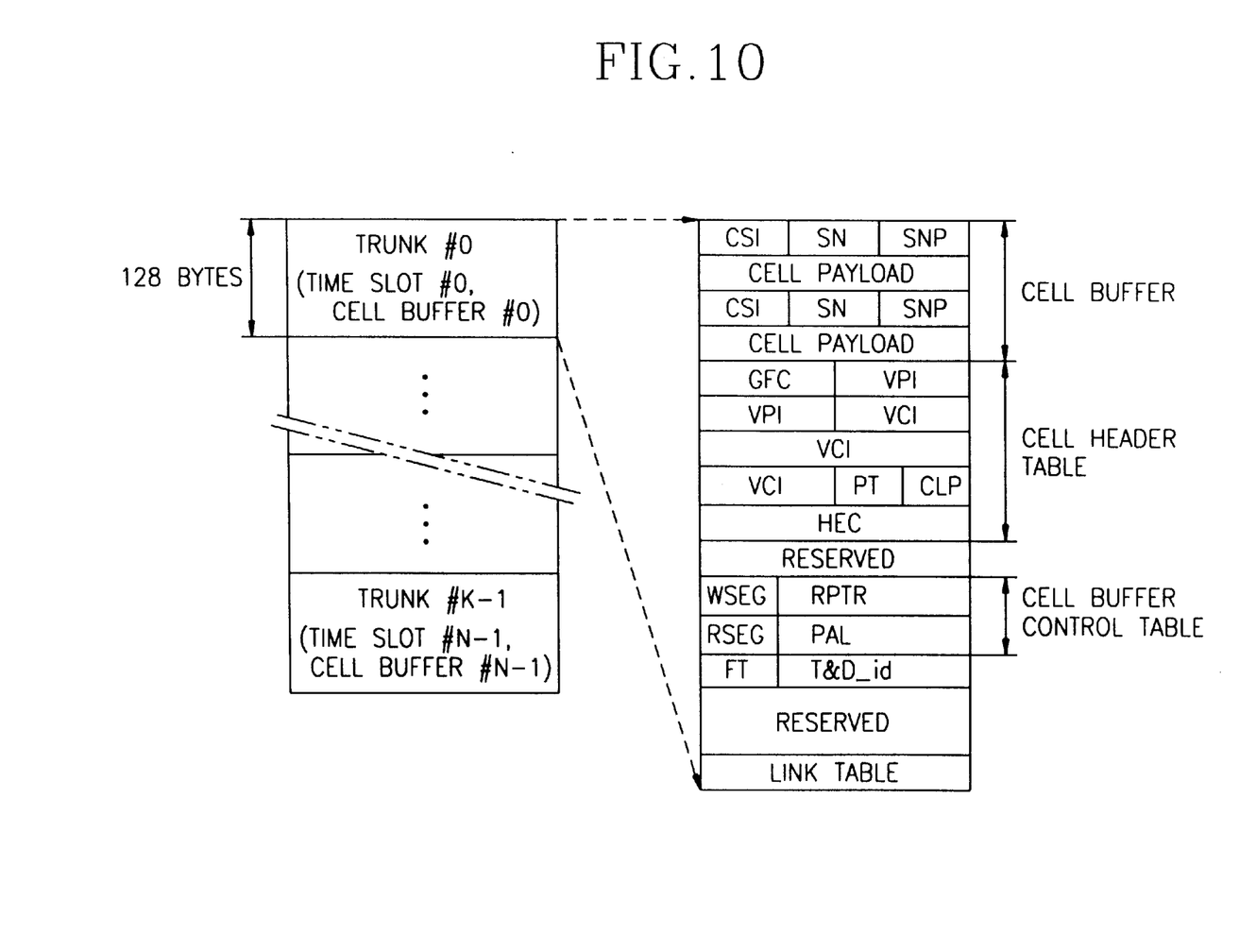
FIG. 10 is a diagram of a cell buffer map file of the memory unit in FIG. 6.
Figure 11:
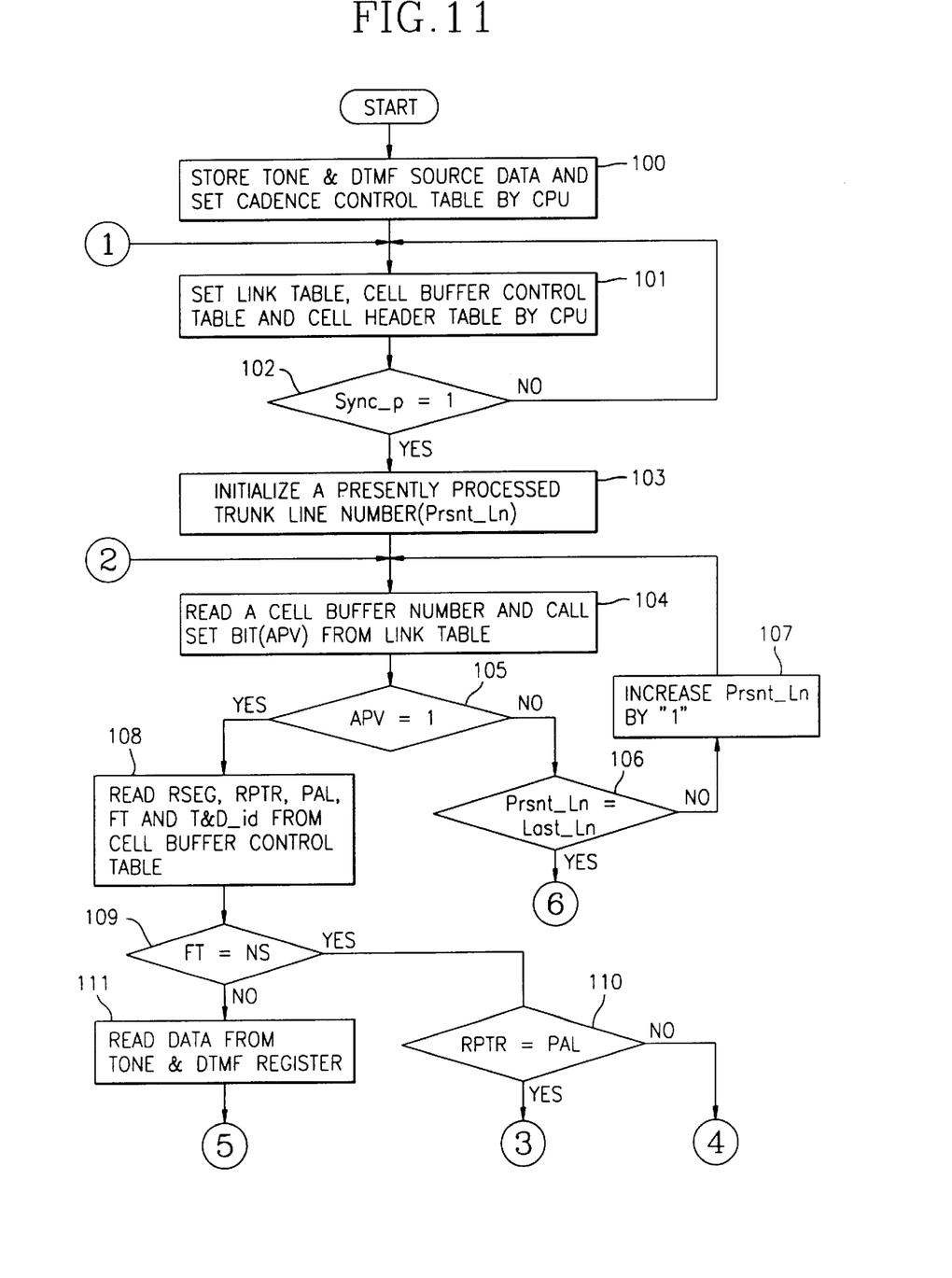
FIG. 11 is a flowchart illustrating an operation of the data converting unit in FIG. 6.

As shown in FIG. 11, in the CPU access state, the CPU (not shown) stores the source data (PCM codes) in the tone and DTMF source buffer of FIG. 8 and sets the cadence control table of FIG. 9 (100). Additionally, the CPU sets the link table, the cell buffer control table and the cell header table provided in the memory unit 20 (101). Here, it is noted that access to the memory unit 20 by other hardware blocks is prohibited.

Then, when a synchronous pulse signal Syn_P is activated, the FSM initializes the trunk line number Prsnt_Ln which is being currently processed and transits to the link table access state (103). While, in the link table access state, the FSM reads a cell buffer number allocated to a channel of each trunk line and a call set bit APV of the corresponding channel, based upon a trunk line number and a time slot number (channel number) outputted from the state/timing signal generating unit 11, and then checks whether a call is set in the corresponding channel (104, 105).

If no call is set in the corresponding channel (APV=0), the FSM repeatedly performs the link table access state after increasing the trunk line number Prsnt_Ln of the corresponding channel by "1" (107, 104), and transits to the cadence control table state when the trunk line number Prsnt_Ln of the corresponding channel is identical to a last trunk line number (106). That is, in the conventional art, when the trunk line number Prsnt_Ln of the corresponding channel is identical to the last trunk line number, the FSM checks whether or not the FIFO 12 is empty and then transits to the cell receiving state or the CPU access state, while according to the present invention the FSM transits to the cadence control table access state, regardless of the empty state of the FIFO 12.

On the other hand, when the call is established in the corresponding channel (APV=1), the FSM transits to the control table access state. In the control table access state, the FSM reads the function type FT and the tone and DTMF register number T&D_id as well as a read segment bit RSEG, a read pointer of the cell buffer RPTR and a cell payload length PAL from the cell buffer control table corresponding to the cell buffer number which is read in the link table access state (108). Further, the FSM checks whether the function type FT which has been read is NS or T&D (109).

Thus, if the function type FT is NS, the FSM transits to the cell buffer access state, identically to the conventional art, and if T&D, the FSM transits to the tone and DTMF register access state. In the present invention, however, the information which have been read from the cell buffer control table have its original meaning only when the function type FT is NS. That is, if the function type FT is T&D, the read segment bit RSEG, the read pointer RPTR of the cell buffer and the cell payload length PAL become insignificant.

Therefore, if the function type FT is NS, the FSM transits to the cell buffer access state, thereby comparing the read pointer RPTR with the cell payload length PAL which have been read from the cell buffer control table (110). If the read pointer RPTR is identical to the cell payload length PAL, the FSM reads the channel data from the cell buffer, intializes the read pointer RPTR and inverts the read segment bit RSEG which indicates a cell buffer indicator (112). While, if the read pointer RPTR has a value different from the cell payload length PAL, the FSM reads the channel data from the cell buffer and increases the read pointer RPTR by "1" (113). When the above steps (112, 113) are completed, the FSM transits to the control table update state and thus corrects a value of the cell buffer control table (114).

On the other hand, the function type FT is T&D, the FSM transits to the tone and DTMF register access state and thus reads the tone and DTMF data from the tone and DTMF register of the memory unit 20, based upon the tone and DTMF register number T&D_id which has been read from the cell buffer control table (111).

Next, the FSM transits to the line data demultiplexing unit access state and thus reads data from the cell buffer or the tone and DTMF register and outputs the data to the line data demultiplexing unit 18 (115). Further, in the above state the FSM compares the trunk line number Prsnt_Ln which is being presently processed with the last trunk line number (116). Accordingly, if the two compared trunk line numbers are different, the FSM increases the present trunk line number Prsnt_Ln by "1" and then again transits to the link table access state (117), while if the two numbers are identical, the FSM transits to the cadence control table access state. In other words, according to the present invention, the FSM of the data converting unit 22 outputs to the line data demultiplexing unit 18 the data which have been read from the cell buffer or the tone and DTMF register, and if the trunk line number Prsnt_Ln of the corresponding channel is identical to the last trunk line number Last_Ln connected with the ATM cell converting apparatus, the FSM transits to the cadence control table access state to thereby generate the tone and DTMF.

Further, in the cadence control table access state, the FSM accesses the cadence control table shown in FIG. 9 in accordance with the characteristic number of the cadence control table which corresponds to the time slot number, then reads information (APV) indicating validity of cadence control table information, a presently processed element number PEN, a remain time Remain_Time of the present element and a last element number LEN, and transits to the source buffer access state.

Next, in the source buffer access state, the FSM reads from the cadence control table a tone and DTMF source number SB_id of an element corresponding to the element PEN (119), reads tone and DTMF source data, as shown in FIG. 8, from the tone and DTMF source buffer designated by the source number SB_id, and transits to a tone and DTMF register modifying state. In such a state, the FSM stores the tone and DTMF source data which have been read in the source buffer access state in the tone and DTMF register which is linked to the cadence control table (120) and transits to a cadence control table modifying state.

In the cadence control table modifying state, the FSM modifies the cadence control table in accordance with the condition of the cadence unit time flag which is set by the counter 21. That is, a count value of the counter 21 is increased every frame by "1" and the cadence unit time flag is set as "1" when the predetermined number set by the CPU is identical to the count value. Also, since the predetermined number is different from the count value thereof in the following frame, the cadence unit time flag is again set as "0". Therefore, the cadence unit time flag is set as "1" for 1 frame by considering 1 cycle as the value which is set by the CPU×1 frame time, that eventually means the cadence unit time.

Accordingly, in the cadence control table modifying state, the FSM decreases by "1" the remain the remain time Remain_Time of the presently processed element if the cadence unit time flag is "1" (121, 122, 123), and no modification is made to the contents of the cadence control table if the flag is "0". If the cadence unit time flag is "1" and the remain time Remain_Time of the currently processed element is "0", the FSM increases the element number PEN by "1" and modifies the remain time Remain_Time by reading the cadence time Cadnc_Time of a next element (122, 125, 127). However, if the element number PEN is identical to the last element number LEN in the cadence control table, the FSM intializes the current element number PEN to a first element number and reads the cadence time Cadnc_Time of the first element to thereby modify the remain time Remain_Time (124, 126, 127). When the cadence control table modifying state is completed, the FSM checks the empty state of the FIFO 12 and then transits to the cell receiving state or to the CPU access state (128). Namely, if the FIFO 12 is empty, the FSM directly transits to the CPU access state and if not, the FSM transits to the cell receiving state and then to the CPU access state.

In the cell receiving state, the cell transmission control unit 13 stores one ATM cell received from the FIFO 12 in the cell buffer of the memory unit 20 (129) and after completing the storing of the ATM cell transmits to the FSM a cell end signal Cell_end=1 indicating the completion of receiving the ATM cell (130). Accordingly, the FSM transits to the CPU access state from the cell receiving state, thereby repeatedly performing the above operation.

The operation of the FSM of the data converting unit 22 for 1 time slot is illustrated in FIG. 7. As shown therein, the FSM performs the tone and DTMF generation and the CPU access operation in the 1 time slot in addition to the outputting of the channel data or tone and DTMF data. Since the FSM performs the single generation of the tone and DTMF data every time slot, the number of tone and DTMF is identical to the number of the time slots in the 1 frame. Also, since the cadence control table should exist every tone and DTMF, the number of the cadence control tables is the same as the number of the time slots in the 1 frame.

Because tone and DTMF which should be actually generated are such that tone and DTMF sources are combined and repeated in accordance with the individual cadence, the contents of the cadence control tables are the tone and DTMF source numbers SB_id required to generate the tone and DTMF and the time information (cadence) allocated to the tone and DTMF sources. In reality, for the required tone and DTMF lots of the tone and DTMF sources are not needed for its combination, but according the present invention the number of the tone and DTMF sources is not subject to special limit. Thus, the number of items of each cadence control table can be configured as much as needed.

The data converting unit 22 according to the present invention accesses the link table, the cell buffer control table and the cell buffer and thereby outputs to the line data demultiplexing unit 18 the ATM cell data which are applied from the ATM switching network and stored in the cell buffer, or accesses the tone and DTMF register and outputs the tone and DTMF data to the line data demultiplexing unit 18. Further, the data converting unit 22 stores every time slot the tone and DTMF data read from the tone and DTMF source buffer in accordance with the cadence control table to thereby generate the tone and DTMF data. Therefore, the line data demultiplexing unit 18 applies the time division inverse multiplexing to the data outputted from the data converting unit 22 or the tone and DTMF data which are thereby to become 1 byte parallel data, and the serial/parallel converting unit 19 converts the output of the line data demultiplexing unit 18 to the serial data which is transmitted to the TDM network.

As described above, according to the present invention, the function of generating the tone and DTMF is added to the conventional ATM cell converting apparatus, thereby having an effect of outputting the tone and DTMF which are necessary to the switching system to the TDM network.

Further, the ATM cell converting apparatus of the present invention increases the memory unit as much as the capacity for providing the tone and DTMF source buffer, the cadence control table and the tone and DTMF register, thereby generating the tone or DTMF as many as the number of the time slots in the 1 frame. Thus, no separate hardware configuration element is required to generate the tone or DTMF as in the conventional art, thereby simplifying the construction of the ATM switching system.

Lastly, the ATM cell converting apparatus of the present invention easily modifies the tone or DTMF by changing only the cadence with the same tone and DTMF sources and it is possible to achieve on-line change to be suitable for the software system.

It will be apparent to those skilled in the art that various modifications and variations can be made in the ATM cell converting apparatus and method of the present invention without departing from the spirit or scope of the invention. Thus, it is intended that the present invention cover the modifications and variations of this invention provided they come within the scope of the appended claims and their equivalents.

What is claimed is:

1. In a switch system which mutually operates a Time Division Multiplex (TDM) network and an Asynchronous Transfer Mode (ATM) network, an ATM cell converting apparatus, comprising:
    an ATM cell transmission line coupled with the ATM network;
    a plurality of trunk lines coupled with the TDM network; and
    an ATM cell converting unit, which generates tone and DTMF data according to time and source information and outputs to the plurality of trunk lines one of ATM cell data received through the ATM cell transmission line and the tone and DTMF data, wherein the ATM cell converting unit generates tone and DTMF data by combining tone and DTMF sources with a cadence, and wherein the cadence is the time information and the tone and DTMF sources are the source information.

2. The ATM cell converting apparatus according to claim 1, further comprising:
    a counter, which generates a unit time of a cadence in accordance with a control of a CPU.

3. The ATM cell converting apparatus according to claim 1, wherein to generate the tone and DTMF the ATM cell converting unit reads from a cadence control table an element to be presently processed in accordance with a time slot number, reads tone and DTMF sources of the corresponding element from a tone and DTMF source buffer and stores the tone and DTMF sources in a tone and DTMF register to thereby modify the cadence control table in accordance with a cadence unit time flag.

4. The ATM cell converting apparatus according to claim 1, wherein the ATM cell converting unit includes:
    a FIFO for receiving an ATM cell through the ATM cell transmission line;
    a state/timing signal generating unit for generating various timing signals;
    a memory unit for storing the ATM cell type data and the tone and DTMF data;
    a cell transmission control unit for reading the ATM cell from the FIFO and storing the ATM cell in the memory unit;
    a data converting unit for reading from the memory unit the ATM cell type data or the tone and DTMF data in accordance with a function type;
    a line data demultiplexing unit for performing inverse multiplexing of an output of the data converting unit; and
    a serial/parallel converting unit for converting an output of the line data demultiplexing unit to serial data and outputting the data to the plurality of trunk lines.

5. The ATM cell converting apparatus according to claim 4, wherein the memory unit includes:
    a link table in which cell buffer numbers are stored;
    a cell buffer control table in which there are stored a read segment bit, a read pointer, an effective payload length and a function type of each cell buffer and tone and DTMF register numbers;

a cell header table in which header information of an ATM cell is stored;

a cell buffer in which a received ATM cell is stored;

a tone and DTMF source buffer for storing a source of tone and DTMF;

a cadence control table wherein cadences are stored, the cadence being allocated to a tone and DTMF source number and each tone and DTMF source; and a tone and DTMF register for storing tone and DTMF data which are generated by the combination of the tone and DTMF source and the cadence.

6. The ATM cell converting apparatus according to claim 5, wherein the tone and DTMF source is a PCM code of a signal in which at least two frequencies combine.

7. The ATM cell converting apparatus according to claim 5, wherein each number of the cadence control table and the tone and DTMF register is identical to the number of time slots in 1 frame.

8. The ATM cell converting apparatus according to claim 5, wherein the cadence control table stores:

information indicating the validity of cadence control table information;

a presently processed element number;

a remain time of the corresponding element;

a last element number;

a tone and DTMF source number of each element; and a cadence time of each element.

9. The ATM cell converting apparatus according to claim 3, wherein the data converting unit reads the ATM cell type data stored in the cell buffer by using the read pointer if the function type which has been read from the cell buffer control table of the memory unit is an NS mode (normal service), while the data converting unit reads the tone or DTMF data from the tone and DTMF register corresponding to a tone and DTMF register number of the cell buffer control table if the function type is a T&D mode (tone and DTMF service).

10. The ATM cell converting apparatus according to claim 3, wherein for the 1 time slot the data converting unit performs all of the operations of reading the ATM cell type data or tone and DTMF data, generating the tone and DTMF and accessing the CPU.

11. The ATM cell converting apparatus according to claim 8, wherein the operation of generating the tone and DTMF is carried out if a trunk line number of a presently processed channel is identical to a last trunk line number which is connected with the ATM cell converting apparatus.

12. The ATM cell converting apparatus according to claim 8, wherein in order to generate the tone and DTMF the data converting unit sequentially performs a cadence control table access state, a source buffer access state, a tone and DTMF register modifying state and a cadence control table modifying state.

13. The ATM cell converting apparatus according to claim 12, wherein the cadence control table access state is to access the cadence control table in accordance with a characteristic number of the cadence control table which corresponds to the time slot number for thereby reading information indicating validity of cadence control table information, a presently processed element number, remain time of the corresponding element and a last element number.

14. The ATM cell converting apparatus according to claim 12, wherein the source buffer access state is to read a tone and DTMF source number of a presently processed element from the cadence control table to thereby read a tone and DTMF source from the tone and DTMF source buffer which is designated by the tone and DTMF source number.

15. The ATM cell converting apparatus according to claim 12, wherein the tone and DTMF register modifying state is to store the tone and DTMF source which has been read in the source buffer access state in the tone and DTMF register linked with the corresponding cadence control table.

16. The ATM cell converting apparatus according to claim 12, wherein the cadence control table modifying state is to modify the cadence control table in accordance with a condition of a cadence unit time flag which is set by a frame counter.

17. The ATM cell converting apparatus according to claim 16, wherein when a count value is identical to a specific value set by the CPU, the frame counter sets the cadence unit time flag as "1".

18. The ATM cell converting apparatus according to claim 17, wherein 1 cycle of the cadence unit time flag is the CPU-set-value×1 frame time.

19. The ATM cell converting apparatus according to claim 16, wherein the cadence control table modifying state is to decrease the remain time of the presently processed element by "1" if the cadence unit time flag is "1", and does not modify contents of the cadence control table if the cadence unit time flag is "0".

20. The ATM cell converting apparatus according to claim 16, wherein the cadence control table modifying state is to modify the remain time by reading a cadence time of a next element if the cadence unit time flag is "1" and the remain time of the presently processed element is "0".

21. The ATM cell converting apparatus according to claim 16, wherein the cadence control table modifying state is to modify the remain time by reading a cadence time of a first element if the presently processed element is the last element which has been read in the cadence control table access state.

22. In a switch system which mutually operates a Time Division Multiplex (TDM) network and an Asynchronous Transfer Mode (ATM) network, an ATM cell converting method, comprising the steps of:

discriminating a function type by accessing a memory unit;

determining whether a trunk line number of a presently processed channel is a last trunk line number;

generating tone and DTMF data if the trunk line number of the presently processed channel is the last trunk line number;

storing the tone and DTMF data in the memory unit;

outputting one of an ATM cell and the tone and DTMF data as channel data to a line demultiplexing unit based on the function type; and setting various tables of the memory unit if the tone and DTMF data are generated.

23. The ATM cell converting method according to claim 22, wherein the the above steps are performed in one time slot.

24. The ATM cell converting method according to claim 22, wherein the memory unit includes:

a link table in which cell buffer numbers are stored;

a cell buffer control table in which there are stored a read segment bit, a read pointer, an effective payload length and a function type of each cell buffer and tone and DTMF register numbers;

a cell header table in which header information of an ATM cell is stored;

a cell buffer in which a received ATM cell is stored;

a tone and DTMF source buffer for storing sources of tone and DTMF;

a cadence control table for storing cadences which are respectively allocated to a tone and DTMF source number and each tone and DTMF source; and a tone and DTMF register for storing tone and DTMF data which are generated by the tone and DTMF source and the cadence.

25. The ATM cell converting method according to claim 24, wherein each number of the cadence control table and the tone and DTMF register is identical to the number of time slots in 1 frame.

26. The ATM cell converting method according to claim 22, wherein the step of discriminating the function type includes the sub-steps of:

accessing a link table of the memory unit in accordance with a trunk line number and time slot number outputted from a state/timing signal generating unit;

reading each item of the cell buffer control table on the basis of a cell buffer number which has been read from the link table; and determining whether the function type is an NS mode or a T&D mode.

27. The ATM cell converting method according to claim 26, wherein each item is the read segment bit, the read pointer, the effective payload length and the function type of each cell buffer and the tone and DTMF register number, respectively.

28. The ATM cell converting method according to claim 22, wherein the step of outputting comprises outputting the channel data which have been read from the cell buffer if the function type is the NS mode and outputting the tone and DTMF data which have been read from a tone and DTMF register if the function type is T&D mode.

29. The ATM cell converting method according to claim 22, wherein the step of generating the tone and DTMF data comprises the further steps of:

reading from a cadence control table an element which is to be presently processed in accordance with a time slot number;

reading tone and DTMF sources of a corresponding element from a tone and DTMF source buffer;

storing the tone and DTMF source in a tone and DTMF register; and modifying the cadence control table in accordance with a condition of a cadence unit time flag.

30. The ATM cell converting method according to claim 29, wherein the step of reading from the cadence control table further comprises the step of reading information indicating the validity of cadence control table information, a presently processed element number, a remain time of the corresponding elements and a last element number.

31. The ATM cell converting method according to claim 29, wherein the tone and DTMF source is a PCM code of a signal in which at least two frequencies combine.

32. The ATM cell converting method according to claim 29, wherein the cadence unit time flag is generated by a counter which sets the cadence unit time flag as "1" when a value which is counted every frame is identical to a specific value set by a CPU.

33. The ATM cell converting method according to claim 32, wherein 1 cycle of the cadence unit time flag is the CPU-set-value×1 frame time.

34. The ATM cell converting method according to claim 29, wherein the step of modifying the cadence control table further comprises the steps of:

decreasing a remain time of the element if the cadence unit time flag is set;

modifying the remain time if the remain time of the element is "0" by reading a cadence time of a next element; and modifying the remain time to a cadence time of a first element if the element is a last element.

35. In a switch system which mutually operates a Time Division Multiplex (TDM) network and an Asynchronous Transfer Mode (ATM) network, an ATM cell converting apparatus, comprising:

an ATM cell transmission line coupled with the ATM network;

a plurality of trunk lines coupled with the TDM network;

an ATM cell converting unit, which generates tone and DTMF data according to time and source information and outputs to the plurality of trunk lines one of ATM cell data received through the ATM cell transmission line and the tone and DTMF data; and a counter, which generates a unit time of a cadence in accordance with a control of a CPU.

36. In a switch system which mutually operates a Time Division Multiplex (TDM) network and an Asynchronous Transfer Mode (ATM) network, an ATM cell converting apparatus, comprising:

an ATM cell transmission line coupled with the ATM network;

a plurality of trunk lines coupled with the TDM network; and an ATM cell converting unit, which generates tone and DTMF data according to time and source information and outputs to the plurality of trunk lines one of ATM cell data received through the ATM cell transmission line and the tone and DTMF data, wherein to generate the tone and DTMF data the ATM cell converting unit reads from a cadence control table an element to be processed in accordance with a time slot number, reads tone and DTMF sources of a corresponding element from a tone and DTMF source buffer, and stores the tone and DTMF sources in a tone and DTMF register to thereby modify the cadence control table in accordance with a cadence unit time flag.

37. In a switch system which mutually operates a Time Division Multiplex (TDM) network and an Asynchronous Transfer Mode (ATM) network, an ATM cell converting apparatus, comprising:

an ATM cell transmission line coupled with the ATM network;

a plurality of trunk lines coupled with the TDM network; and an ATM cell converting unit, which generates tone and DTMF data according to time and source information and outputs to the plurality of trunk lines one of ATM cell data received through the ATM cell transmission line and the tone and DTMF data, wherein the ATM cell converting unit further comprises, a FIFO, to receive an ATM cell through the ATM cell transmission line, a state/timing signal generating unit, which generates various timing signals, a memory unit, to store the ATM cell data and the tone and DTMF data, a cell transmission control unit, which reads the ATM cell from the FIFO and stores the ATM cell in the memory unit, a data converting unit, which reads from the memory unit the ATM cell data or the tone and DTMF data in accordance with a function type, a line data demultiplexing unit, which performs inverse multiplexing of an output of the data converting unit, and a serial/parallel converting unit, which converts an output of the line data demultiplexing unit to serial data and outputs the data to the plurality of trunk lines.

* * * * *